(12) United States Patent
Zhang et al.

(10) Patent No.: US 8,164,305 B2
(45) Date of Patent: Apr. 24, 2012

(54) BATTERY MANAGEMENT SYSTEM WITH ENERGY BALANCE AMONG MULTIPLE BATTERY CELLS

(75) Inventors: Chutao Zhang, Shenzhen (CN); Songtao Chen, Shenzhen (CN)

(73) Assignee: O2Micro International, Ltd., Georgetown (KY)

( * ) Notice: Subject to any disclaimer, the term of this patent is extended or adjusted under 35 U.S.C. 154(b) by 0 days.

(21) Appl. No.: 12/891,784

(22) Filed: Sep. 27, 2010

(65) Prior Publication Data

US 2011/0076525 A1   Mar. 31, 2011

(30) Foreign Application Priority Data

Sep. 29, 2009  (CN) .......................... 2009 1 0178565

(51) Int. Cl.
*H02J 7/00* (2006.01)

(52) U.S. Cl. ....................................................... 320/118
(58) Field of Classification Search ................... 320/118
See application file for complete search history.

(56) References Cited

U.S. PATENT DOCUMENTS

| | | | |
|---|---|---|---|
| 6,356,055 B1 * | 3/2002 | Lin et al. ........................ | 320/116 |
| 6,586,910 B2 * | 7/2003 | Matsui et al. .................. | 320/122 |
| 6,670,789 B2 * | 12/2003 | Anzawa et al. ................ | 320/118 |
| 7,049,791 B2 * | 5/2006 | Lin et al. ........................ | 320/121 |
| 7,061,207 B2 * | 6/2006 | Patel et al. ..................... | 320/119 |
| 7,564,218 B2 * | 7/2009 | Ooishi et al. .................. | 320/118 |

OTHER PUBLICATIONS

Office Action of U.S. Appl. No. 13/100,451, mailed Oct. 11, 2011.

\* cited by examiner

*Primary Examiner* — Ramy Ramadan
(74) *Attorney, Agent, or Firm* — Wang Law Firm, Inc.; Li K. Wang

(57) ABSTRACT

The present invention provides a battery circuit including a first battery cell with a first parameter having a first value and a second battery cell with a second parameter having a second value. The second battery cell is coupled to the first battery cell in series. The battery circuit further includes a magnetic device operable for storing energy transferred from the first battery cell via a first winding coupled to the first battery cell and for releasing the stored energy to the second battery cell via a second winding coupled to the second battery cell if the first value of the first parameter is greater than the second value of the second parameter.

6 Claims, 11 Drawing Sheets

BATTERY MANAGEMENT SYSTEM WITH ENERGY BALANCE AMONG MULTIPLE BATTERY CELLS

FIELD OF THE INVENTION

The present invention relates to a battery system, more specifically, relates to a battery management system for balancing energy among multiple battery cells.

BACKGROUND OF THE INVENTION

Nowadays, a battery pack, e.g., a Lithium-Ion battery pack, including multiple battery cells is widely used in many electrical products, e.g., hybrid electric vehicle and electric vehicle applications. In general, the battery cells degrade gradually and slowly and each battery degrades differently from other. As a result, voltages and states of charge (SOC) of the battery cells may be different from each other after multiple cycles of charging and discharging, and this difference in degradation leads to unbalances between the battery cells.

During a charging process, if the unbalances between the battery cells occur, when a battery management system detects a battery cell having lowest charge is not at full charge, the battery management system may continue to charging the whole battery pack. As a result, the other battery cells having higher charge may be over-charged. During a discharging process, when the battery management system detects a battery cell having a highest charge is not at full discharge, the battery management system may control the whole battery pack to provide power continuously. As a result, the other battery cells having lower charge may be over-discharged. Hence, a battery management system may need to move energy from a cell or group of cells to another cell or group of cells to balance the battery cells.

FIG. 1 shows a block diagram of a conventional battery management system 100. As shown in FIG. 1, a battery pack 102 includes multiple battery cells 102_1-102_M. A transformer in the battery management system 100 includes a primary winding 104 and multiple secondary windings 106_1-106_M having the same number of turns. The primary winding 104 is coupled to a switch 108 in series. Each battery cell 102_K is coupled to a corresponding secondary winding 106_K (K=1, 2, ..., M).

During a balancing period, when the switch 108 is turned on, a discharging current flows from the battery pack 102 to the primary winding 104. Energy can be accumulated in a magnetic core of the transformer temporarily. When the switch 108 turns off, currents $I_1, I_2, I_3, \ldots,$ and $I_M$ are induced in the secondary winding 106_1-106_M and flow to the battery cells 102_1-102_M respectively. Thus the energy stored in the magnetic core can be released to the battery cells 102_1-102_M. Since the currents $I_1, I_2, I_3, \ldots,$ and $I_M$ are reversely proportional to the voltages of the battery cells 102_1-102_M, a battery cell with a minimal voltage can receive most of the energy. Additionally, a battery cell 102_K ($1 \leq K \leq M$) with a maximal voltage can still receive a current $I_K$ even though the current $I_K$ is relatively small. Thus each battery cell can receive some energy released from the magnetic core, which may decrease the balancing efficiency of the battery management system 100.

SUMMARY OF THE INVENTION

The present invention provides a battery circuit including a first battery cell with a first parameter having a first value and a second battery cell with a second parameter having a second value. The second battery cell is coupled to the first battery cell in series. The battery circuit further includes a magnetic device operable for storing energy transferred from the first battery cell via a first winding coupled to the first battery cell and for releasing the stored energy to the second battery cell via a second winding coupled to the second battery cell if the first value of the first parameter is greater than the second value of the second parameter.

In another embodiment, the present invention provides a method for managing a first and second battery cells. The method includes the steps of detecting a first parameter of the first battery cell, detecting a second parameter of the second battery cell, and conducting a first current flowing from the first battery cell to a first winding of a magnetic device and conducting a second current flowing from a second winding of the magnetic device to the second battery cell alternately to transfer energy from the first battery cell to the second battery cell via the magnetic device if a first value of the first parameter is greater than a second value of the second parameter.

In yet another embodiment, the present invention provides a battery management system for managing a battery pack including a plurality of battery cells. The battery management system includes a magnetic device and a detecting and controlling unit. The magnetic device includes multiple windings wiring around a magnetic core and multiple switches. Each switch is coupled between a corresponding battery cell and a corresponding winding. The detecting and controlling unit detects parameters of the battery cells. If a first parameter of the first battery cell is greater than a second parameter of the second battery cell, the detecting and controlling unit turns on a first switch, which is coupled between a first battery cell and a first winding, and a second switch, which is coupled between a second battery cell and a second winding, alternately to move energy from the first battery cell to the second battery cell via the magnetic device.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION OF THE INVENTION

Reference will now be made in detail to embodiments of the present invention. While the invention will be described in conjunction with these embodiments, it will be understood that they are not intended to limit the invention to these embodiments. On the contrary, the invention is intended to cover alternatives, modifications and equivalents, which can be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention can be practiced without these specific details. In other instances, well known methods, procedures, components, and circuits have not been described in detail as not to unnecessarily obscure aspects of the present invention.

Embodiments in accordance with the present invention provide a battery management system for balancing voltages of multiple battery cells. The battery management system controls multiple switches coupled between the multiple battery cells and multiple windings wiring around a magnetic core. If the battery management system detects that a difference between a parameter value of a first battery cell and a parameter value of a second battery cell is higher than a predetermined threshold, the battery management system can turn on first and second switches respectively coupled to the first and second battery cells to transfer energy from the first battery cell to the second battery cell until the voltage of the first battery cell is approximately equal to the voltage of the second battery cell. Additionally, the switches coupled to the other battery cells are kept off during the operation of transferring energy from the first battery cell to the second battery cell. Advantageously, when the battery management system balances the target battery cells and other battery cells are prevented from sending or receiving energy during the energy balancing operation, which improves the system efficiency.

Figure 1:
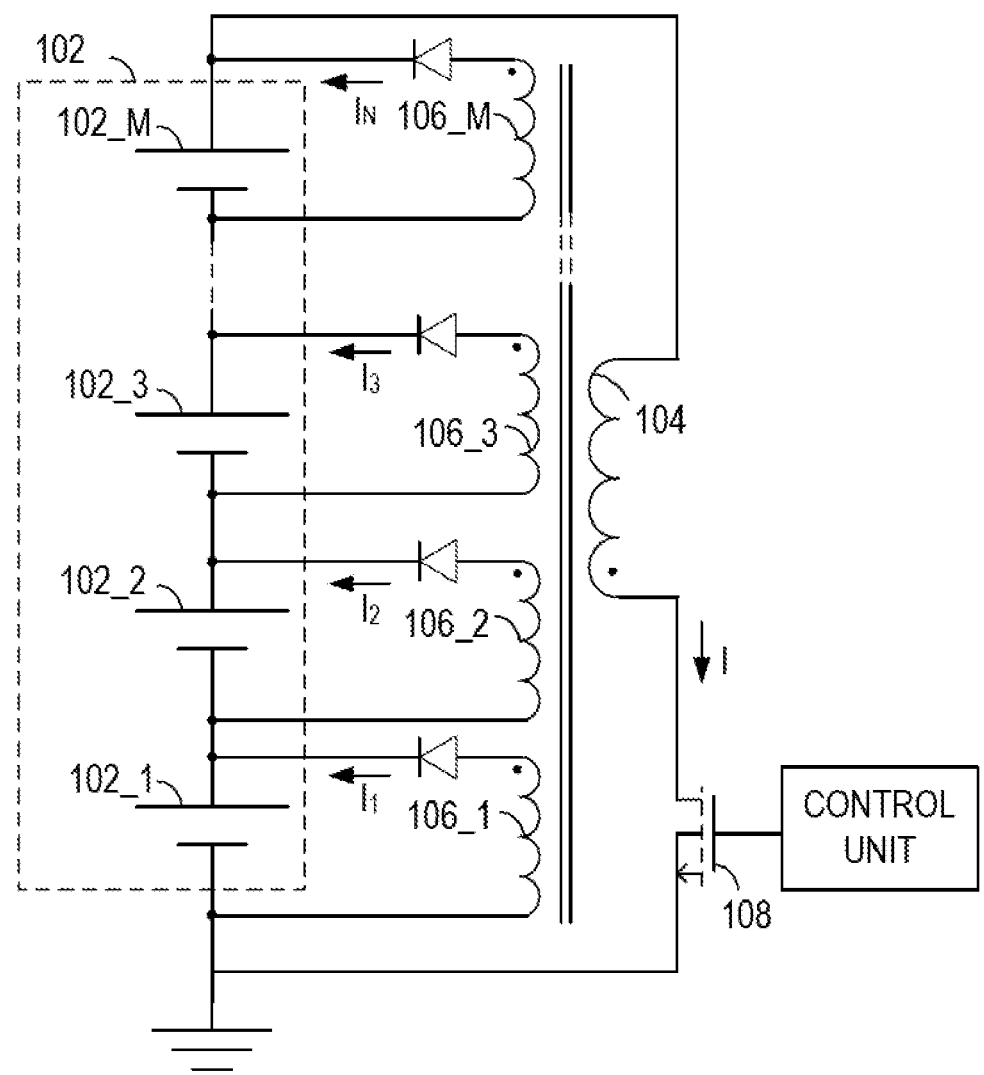
FIG. 1 shows a block diagram of a conventional battery management system.
Figure 2:
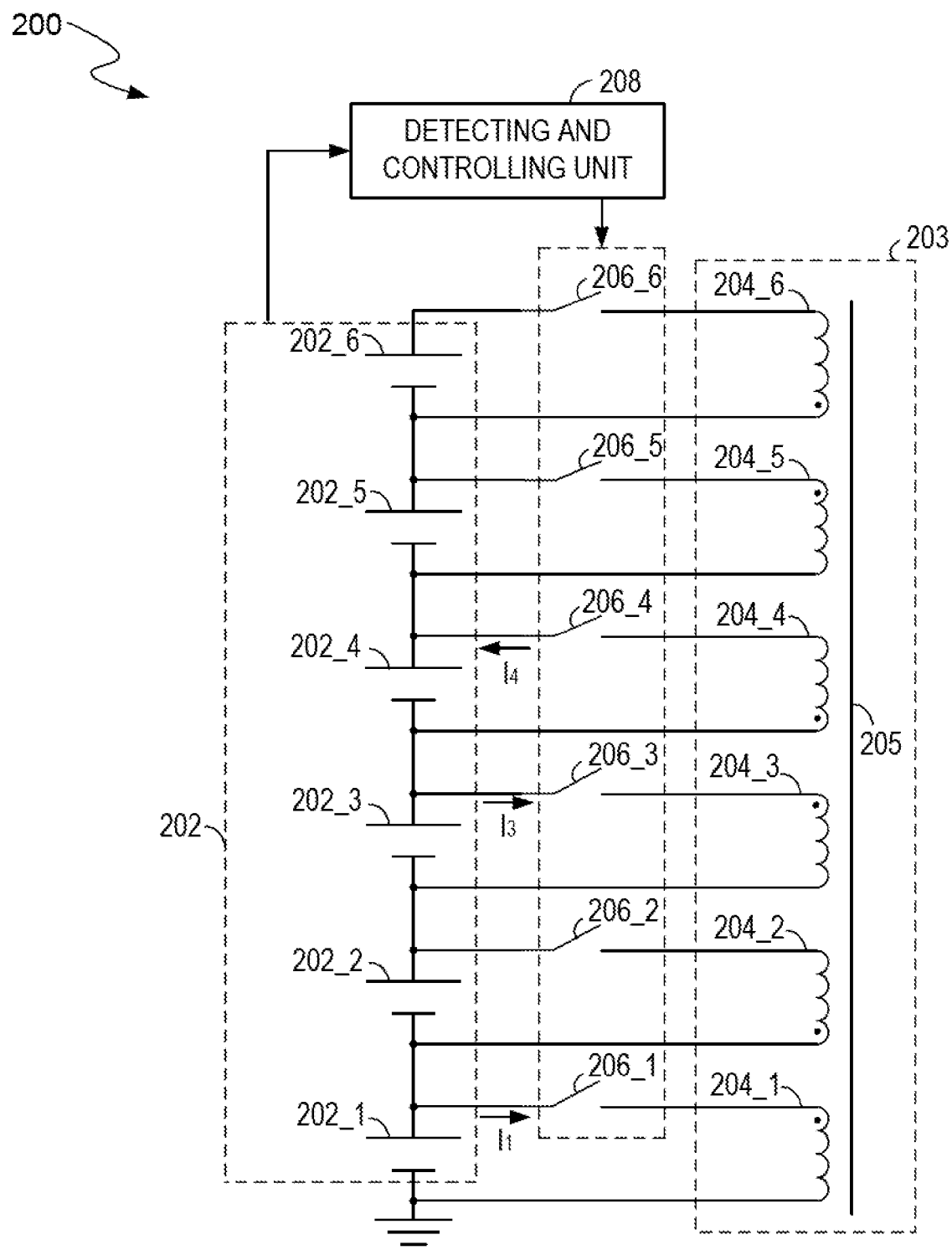
FIG. 2 illustrates a block diagram of a battery management system according to one embodiment of the present invention.

FIG. 2 illustrates a block diagram of a battery management system 200 according to one embodiment of the present invention. The battery management system 200 can move energy between series-coupled battery cells 202_1-202_6 in a battery pack 202 to balance the battery cells 202_1-202_6. The number of the battery cells is set to 6 (as shown in FIG. 2) for illustrative purpose herein. However, the number of the battery cells in the battery pack 220 may vary and the battery pack 202 may include other number of the battery cells.

In one embodiment, a magnetic device 203 includes a magnetic core 205 and multiple windings 204_1-204_6 wiring around the magnetic core 205. The windings 204_1-204_6 are coupled to the battery cells 202_1-202_6 via switches 206_1-206_6 respectively. For example, the winding 204_1 is coupled to the battery cell 202_1 via the switch 206_1. In one embodiment, the windings 204_1-204_6 have the same turns. As shown in FIG. 2, positive terminals of the battery cells 202_1, 202_3 and 202_5 are connected to polarity marks of the windings 204_1, 204_3 and 204_5 respectively, and negative terminals of the battery cells 202_2, 202_4 and 202_6 are connected to polarity marks of the windings 204_2, 204_4 and 204_6 respectively. The polarity marks of the windings 204_1-204_6 are shown as dots at one end of the windings 204_1-204_6. In the following description, the terminals of the battery cells 202_1-202_6, which are connected to the polarity marks of the corresponding windings 204_1-204_6, will be described as dot-connected terminals.

When a first switch and a second switch respectively coupled to a first and a second battery cells of the battery cells 202_1-202_6 are turned on alternatively, a first current, which flows through the first battery cell and a first winding coupled to the first battery cell, and a second current, which flows through the second battery cell and a second winding coupled to the second battery cell, can be conducted alternatively. The first winding functions as a primary winding and the second winding functions as a secondary winding. If the dot-connected terminals of the first and second battery cells have the same polarities, the second current, generated based on the first current, can flow through second winding in the same direction as the first current flowing through the first winding. Otherwise, second current can flow through the second winding in a different direction from the first current flowing through the first winding.

Accordingly, If the dot-connected terminals of the first and second battery cells have different polarities, when the first current flow from the positive terminal to the negative terminal of the first battery cell, the second current will flow from the negative terminal to the positive terminal of the second battery cell. Thus the second battery cell can by charged by the second current and energy can be transferred from the first battery cell to the second battery cell. On the contrary, if the dot-connected terminals of the first and second battery cells have the same polarities, when the first current flow from the positive terminal to the negative terminal of the first battery cell, the second current will also flow from the positive terminal to the negative terminal of the second battery cell. Thus the second battery cell is not charged by the second current.

In an alternative embodiment, the battery management system 200 can have other connections between the battery cells 202_1-202_6 and the windings 204_1-204_6 and is not limited to the connections shown in FIG. 2. For example, the positive terminals of the battery cells 202_1 and 202_2 can be coupled to the polarity marks of the winding 204_1 and 204_2 respectively. The negative terminals of the battery cells 202_3-202_6 can be coupled to the polarity marks of the windings 204_3-204_6.

Furthermore, a detecting and controlling unit 208 detects state parameters, such as voltages of the battery cells 202_1-202_6, and controls the switches 206_1-206_6 according to the detecting results. In one embodiment, the detecting and controlling unit 208 selects a first battery cell which state parameter has a first value and a second battery cell which state parameter has a second value from the battery pack 202. The first value is greater than the second value. Subsequently, the detecting and controlling unit 208 turns on and off the corresponding switches to transfer energy between the first battery cell and the second battery cell via the magnetic device 203.

More specifically, during a charging process, the detecting and controlling unit 208 detects voltages of the battery cells 202_1-202_6 and calculates a difference between a maximal value $V_{1H}$ and a minimal value $V_{1L}$ among the voltages of the battery cells 202_1-202_6. If the difference between the maximal value $V_{1H}$ and the minimal value $V_{1L}$ is higher than a first threshold, e.g., 0.5V, abnormal condition may be present in the battery pack 202. Upon detection of voltage difference being higher than the first threshold value, the battery management system 200 will check the availability of the battery pack 202.

If the difference between the maximal value $V_{1H}$ and the minimal value $V_{1L}$ is lower than a second threshold, e.g., 50 mV, the battery cells 202_1-202_6 are considered to be well balanced. The threshold values may be set according to each characteristics of each battery technology.

If the difference between the maximal value $V_{1H}$ and the minimal value $V_{1L}$ is lower than the first threshold and higher than the second threshold, an unbalance between the battery cells 202_1-202_6 may present in the battery pack 202. The detecting and controlling unit 200 can move energy from a cell or group of cells to another cell or group of cells to balance the battery cells 202_1-202_6.

In one embodiment, if the dot-connected terminal of the battery cell having the maximal value $V_H$, e.g., the battery cell 202_1, and the dot-connected terminal of the battery cell having the minimal value $V_L$, e.g., the battery cell 202_4, have different polarities, the detecting and controlling unit 200 can move energy from the battery cell 202_1 to the battery cell 202_4.

Figure 3:
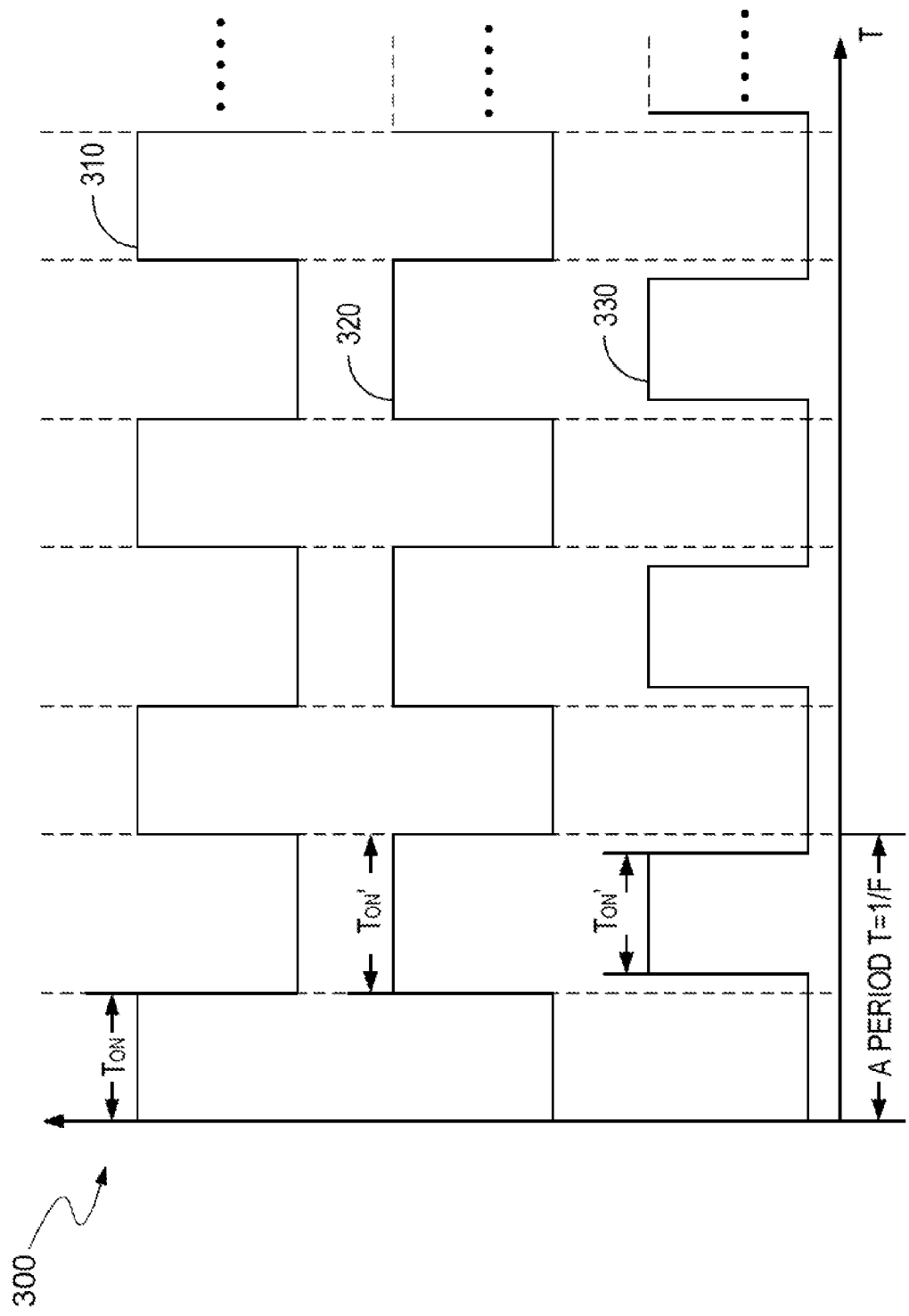
FIG. 3 shows a relationship between a first control signal and a second control signal generated by a detecting and controlling unit of a battery management system according to one embodiment of the present invention.

The detecting and controlling unit 208 generates a first control signal to the switch 206_1 and generates a second control signal to the switch 2064 for turning on and off the switches 206_1 and 206_4 alternately. The first and second control signals can be periodic signals. An overlap between a duty cycle of the first control signal and a duty cycle of the second control signal during a period T is approximately zero. A relationship between the first control signal and the second control signal can be shown in FIG. 3. In FIG. 3, waveform 310 indicates the first control signal having a frequency $F_1$ with a duty cycle $D_1$, waveform 320 indicates the second control signal having a frequency equal to $F_1$ with a duty cycle $D_2$, and waveform 330 indicates the second control signal having a frequency equal to $F_1$ with a duty cycle $D_2'$. The duty cycle $D_2$ and the duty cycle $D_2'$ can be given by equation (1).

$$\begin{cases} D_2 = (1 - D_1) \\ D_2' < (1 - D_1) \end{cases} \quad (1)$$

Under the control of the first and second control signals, the switch 206_1 and the switch 206_4 can be turned on alternately.

When the switch 206_1 is turned on in response to the first control signal, the switch 206_4 is turned off in response to the second control signal. A current $I_1$ flows from the battery cell 202_1 to the winding 204_1. The current gradually increases and energy of the battery cell 202_1 can be transferred to and accumulated in the magnetic core 205 of the magnetic device 203 in a first period, e.g., $T_{ON}$ as shown in FIG. 3. In one embodiment, the first duration $T_{ON}$ can be given by equation (2).

$$T_{on} = \frac{D_1}{F_1} = \sqrt{2 \times L \times \bar{I}} \Big/ \sqrt{V \times F_1} \quad (2)$$

Wherein V represents the voltage of the battery cell 202_1, $\bar{I}$ represents a predetermined average value of the current $I_1$, and L represents an inductance of the winding 204_1, $F_1$ represents the frequency of the first and second control signal.

According to equation (2), the duty cycle $D_1$ can be given by equation (3).

$$D = \sqrt{2 \times L \times \bar{I} \times F_1 / V} \quad (3)$$

After the switch 206_1 is turned off in response to the first control signal, the switch 206_4 is turned on in response to the second control signal. The current $I_1$ decreases to approximately zero. A current $I_4$ is induced in the winding 204_4 and flows to the battery cell 202_4 for charging the battery cell 202_4 during a second duration, e.g., $T_{ON}'$ or $T_{ON}''$ shown in FIG. 3. Thus the energy stored in the magnetic core 205 can be released to the battery cell 202_4. Hence, the energy is transferred from the battery cell 202_1 to the battery cell 202_4. Accordingly, the voltage of the battery cell 202_1 is decreased and the voltage of the battery cell 202_4 is increased. The detecting and controlling unit 208 can turn on the switch 206_1 and 206_4 alternately until the difference between the voltage of the battery cell 202_1 and the voltage of the battery cell 202_4 is less than the second threshold.

The detecting and controlling unit 208 turns off the switches 206_2, 206_3, 206_5 and 206_6 during the operation of balancing the battery cell 202_1 and the battery cell 202_4. Thus, no current can flow into the battery cells 202_2 and 202_6 and no energy can be transferred from the battery cell 202_1 to the battery cells 202_2 and 202_6.

In the above-mentioned embodiment, the winding 204_1 and the winding 204_4 functions as a primary winding and a secondary winding in the magnetic device 203 respectively. However, if the voltage of the battery cell 202_4 has a maximal value and the voltage of the battery cell 202_1 has a minimal value among the voltages of the battery cells 202_1-202_6, the battery management system 200 will transfer energy from the battery cell 202_4 to the battery cell 202_1. Under this circumstance, the winding 202_4 can function as a primary winding and the winding 202_1 can function as a secondary winding. To summarize, the windings 204_1, 204_2, . . . , or 204_6 can function as either a primary winding or a secondary winding under different circumstances.

Advantageously, the battery management system 200 can balance the target battery cells and other battery cells can be prevented from sending or receiving energy during the energy balancing operation, which will improve the system efficiency.

In an alternative embodiment, If the dot-connected terminal of the battery cell having the maximal voltage $V_H$, e.g., the battery cell 202_1, has the same polarity as the dot-connected terminal of the battery cell having the minimal voltage $V_L$, e.g., the battery cell 202_3, a current $I_3$, which is generated based on the current $I_1$ flows through the winding 204_1, flows through the winding 204_3 in the same direction as the current $I_1$. When the current $I_1$ flows from the positive terminal to the negative terminal of the battery cell 202_1, the current $I_3$ also flows from the positive terminal to the negative terminal of the battery cell 202_3. Thus the battery cell 202_3 cannot be charged by the current $I_3$, if the current $I_3$ is generated based on the current $I_1$. Under this circumstance, the battery management system 200 cannot move energy from 202_1 to 202_3 directly. Hence the battery management system 200 needs to select another two battery cells from a set of battery cells, whose dot-connected terminals have different polarity from the dot-connected terminals of the battery cells 202_1 and 202_3, for further operation.

More specifically, the detecting and controlling unit 208 further selects a battery cell having a maximal voltage $V_{2H}$ and a battery cell having a minimal voltage $V_{2L}$ among the set of the battery cells, whose dot-connected terminals have different polarity from the dot-connected terminals of the battery cells 202_1 and 202_3. For example, as shown in FIG. 2, the detecting and controlling unit 208 can select the battery cell 202_4 having the maximal value $V_{2H}$ and the battery cell 202_6 having the minimal value $V_{2L}$ among the battery cells 202_2, 202_4 and 202_6. Subsequently, the detecting and controlling unit 208 will move energy from the battery cell 202_1 to the battery cell 202_6 and move energy from the battery cell 202_4 to the battery cell 202_3.

The detecting and controlling unit 208 turns on the switches 206_1 and 206_6 alternately to transfer energy from the battery cell 202_1 to the battery cell 202_6 in a similar way as described above. Accordingly, the voltage of the battery cell 202_1 can be decreased. Thus an over-charging of the battery cell 202_1 can be avoided during the charging process.

Furthermore, the detecting and controlling unit 208 turns on the switches 206_4 and 206_3 alternately to transfer energy from the battery cell 202_4 to the battery cell 202_3 in a similar way as described above. Accordingly, the voltage of the battery cell 202_3 can be increased. Thus an under-charging of the battery cell 2063 can be avoided after the charging process.

During the operation, the detecting and controlling unit 208 can detect the voltages of the battery cells 202_1-202_6 and balance the battery cells in a similarly way as described above according to the detecting result. As a result, when the charging process is finished, the voltage of each battery cell will be approximately equal, which will improve the charging efficiency and extend battery life of the battery pack 202 by preventing some inside battery cells from being over-charged.

Additionally, during a discharging process, the battery management system 200 can also detect the voltages of the battery cells 202_1-202_6 and balance the battery cells in a similar way as described above. If difference between a maximum value and a minimum value of the voltages of the battery cells 202_1-202_6 is lower than the first threshold or higher than the second threshold, the detecting and controlling unit 208 will balance the corresponding battery cell in similar ways as described above. Thus the whole battery pack 202 can be well balanced in a relatively short time.

Advantageously, by balancing the battery cells during the discharging process, the battery cell which has a higher discharging rate and releases energy more quickly than other battery cells can be compensated with energy from the other battery cells. Thus energy among the battery cells can be well balanced and discharging time of the whole battery pack 202 can be increased, which improves the efficiency of the battery pack 202. Furthermore, the battery cells can be prevented from being over-discharged after the discharging process, which also extends the useful life of the battery pack 202.

In other embodiments, the detecting and controlling unit 208 can detect other state parameters such as states of charges (SOCs) and/or capacitances of the battery cells 202_1-202_6 to balance the battery cells 202_1-202_6 according to the detecting results.

Figure 4:
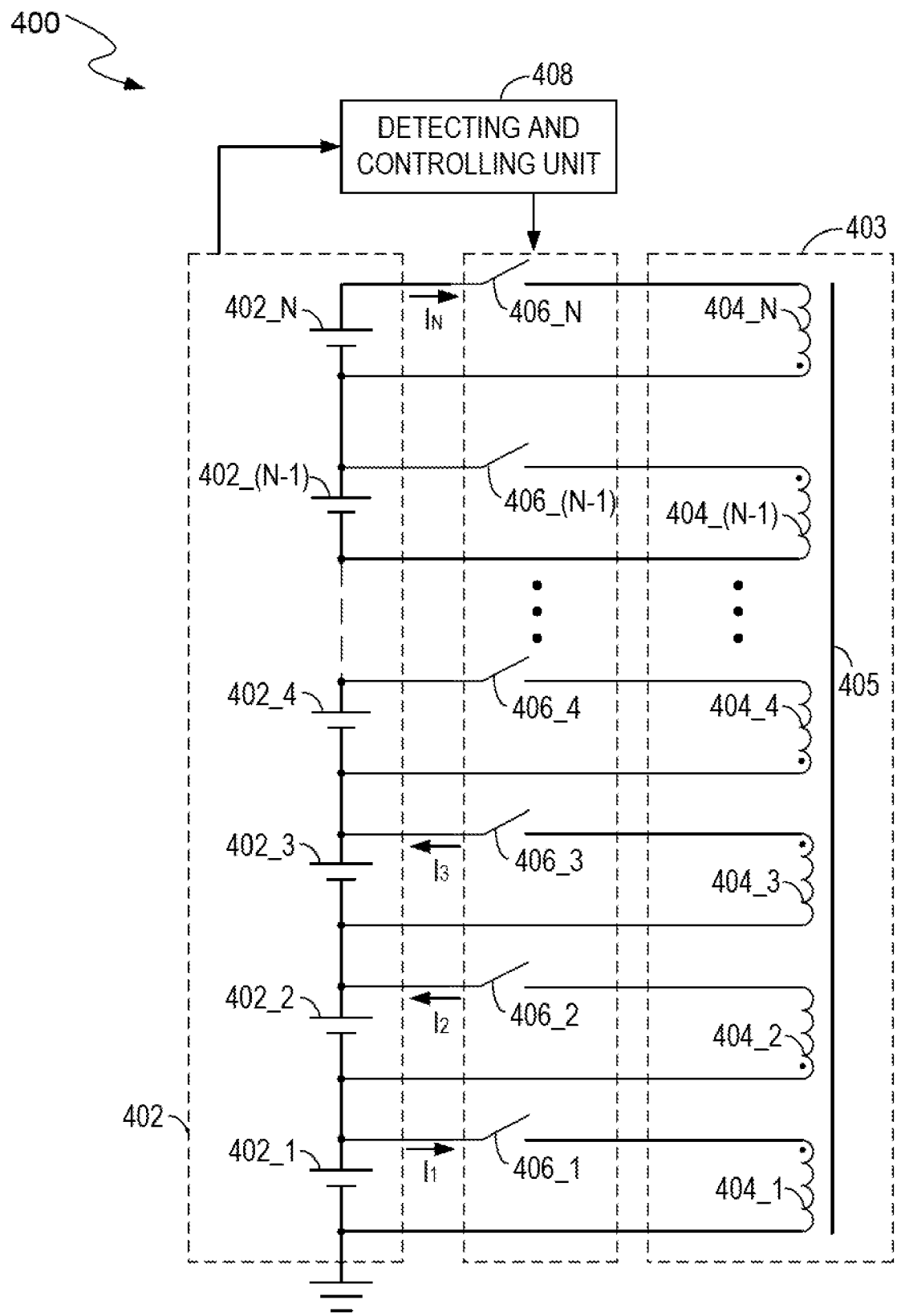
FIG. 4 illustrates a block diagram of a battery management system according to another embodiment of the present invention.

FIG. 4 illustrates a block diagram of a battery management system 400 according to another embodiment of the present invention. Structure of the battery management system 400 is similar to the structure of the battery management system 200 in FIG. 2.

As shown in FIG. 4, the battery management system 400 includes a battery pack 402, a magnetic device 403 and a detecting and controlling unit 408. The battery pack 402 includes N battery cells 402_1-402_N coupled to N windings 404_1-404_N of the magnetic device 403 via N switches 406_1-406_N respectively. N is a positive integer. The N windings 404_1-404_N wire around a magnetic core 405 in the magnetic device 403.

In one embodiment, the battery cells 402_1-402_N are divided into two battery cell groups, e.g., the battery cells 402_1, 402_3, . . . , 402_(N−1) are classified into a first battery cell group, and the battery cells 402_2, 402_4, . . . , 402_N are classified into a second battery cell group. The dot-connected terminals of the battery cells 402_1, 402_3, . . . , 402_(N−1) in the first battery cell group have, different polarity from the dot-connected terminals of the battery cells 402_2, 402_4, . . . , 402_N in the second battery cell group The detecting and controlling unit 408 can detects voltages of the battery cells 402_1-402_N in the battery pack 402 and further selects a battery cell, e.g., the battery cell 402_1, having a maximal voltage $V_{1H}$ and a battery cell, e.g., the battery cell 402_3, having a minimal voltage $V_{1L}$ from the first battery group, and selects a battery cell, e.g., the battery cell 402_N, having a maximal voltage $V_{2H}$ and a battery cell, e.g., the battery cell 402_2, having a minimal voltage $V_{2L}$ from the second battery group.

If a difference $D_{1H1L}$ between the value $V_{1H}$ and the value $V_{1L}$, a difference $D_{2H2L}$ between the value $V_{2H}$ and the value $V_{2L}$, a difference $D_{1H2L}$ between the value $V_{1H}$ and the value $V_{2L}$, or a difference $D_{2H1L}$ between the value $V_{2H}$ and the value $V_{1L}$ is higher than a first threshold, e.g., 0.5V, abnormal condition may present in the battery pack 402. Thus the battery management system 400 will check the availability of the battery pack 402.

If the differences $D_{1H1L}$, $D_{2H2L}$, $D_{1H2L}$, and $D_{2H1L}$ are lower than a second threshold, e.g., 50 mV, the battery cells 402_1-402_N are well balanced.

If the differences $D_{1H1L}$, $D_{2H2L}$, $D_{1H2L}$, and $D_{2H1L}$ are between the first threshold and the second threshold, the battery cells 402_1-402_N are unbalanced. Thus the detecting and controlling unit 408 needs to move energy from the battery cell 402_1, which belongs to the first battery group, to the battery cell 402_2, which belongs to the second battery group, and move energy from the battery cell 402_N, which belongs to the second battery group, to the battery cell 402_3, which belongs to the first battery group according to the following determinations.

Determination 1: if the difference $D_{1H1L}$ or the difference $D_{2H2L}$ is higher than a third threshold, e.g., 0.2V, or if the differences $D_{1H1L}$, $D_{2H2L}$, $D_{2H1L}$, and $D_{1H2L}$ are no higher than the third threshold, the detecting and controlling unit 408 functions in a similar way as described above to move energy from the battery cell 402_1 to the battery cell 402_2 and to move energy from the battery cell 402_N to the battery cell 402_3.

More specifically, the detecting and controlling unit 408 generates a first control signal having a frequency $F_1$ with a duty cycle $D_1$ to the switch 406_1 and generates a second control signal having the same frequency $F_1$ with a duty cycle equal to or less than $(1-D_1)$ to the switch 406_2 for turning on the switch 406_1 and the switch 406_2 alternately. When the switch 406_1 is turned on in response to the first control signal, the switch 406_2 is off in response to the second control signal. A current $I_1$ flows from the battery cell 402_1 to the winding 404_1. Thus energy of the battery cell 402_1 can be transferred to and accumulated in the magnetic core 405. After the switch 406_1 is turned off in response to the first control signal, the switch 402_2 can be turned on in response to the second control signal. Once the switch 406_1 is turned off, the current $I_1$ becomes to approximately zero. When the switch 402_2 is turned on, a current $I_2$ induced in the winding 404_2 flows to the battery cell 402_2 for charging the battery cell 402_2. Thus the stored energy, which is transferred from the battery cell 402_1, in the magnetic core 405 can be released to the battery cell 402_2. The detecting and controlling unit 408 continues to turn on the switch 406_1 and 406_2 alternately until the voltage of the battery cell 402_1 is approximately equal to the voltage of the battery cell 402_2.

Furthermore, the detecting and controlling unit 408 generates a third control signal having a frequency $F_2$ with a duty cycle $D_N$ to the switch 406_N and generates a fourth control signal having the frequency $F_2$ with a duty cycle equal to or less than $(1-D_N)$ to the switch 406_3 for turning on the switches 406_N and 406_3 alternately. In one embodiment, the frequency $F_2$ can be the same as the frequency $F_1$ and the duty cycle $D_N$ can be the same as the duty cycle $D_1$. When the switch 406_N is turned on in response to the third control signal, the switch 406_3 is turned off in response to the fourth control signal. A current $I_N$ flows from the battery cell 402_1 to the winding 404_1. Thus energy of the battery cell 402_N can be transferred to and accumulated in the magnetic core 405. After the switch 406_N is turned off in response to the third control signal, the switch 402_3 can be turned on in response to the fourth control signal. Once the switch 406_N is turned off, the current $I_N$ becomes to approximately zero. When the switch 402_3 is turned on, a current $I_3$ induced in the winding 404_3 flows to the battery cell 402_3 for charging the battery cell 402_3. Thus the stored energy, which is transferred from the battery cell 402_N, in the magnetic core 405 can be released to the battery cell 402_3. The detecting and controlling unit 408 continues to turn on the switch 406_N and 406_3 alternately until the voltage of the battery cell 402_3 increases approximately equal to the voltage of the battery cell 402_N.

Determination 2: if the difference $D_{1H1L}$ and the difference $D_{2H2L}$ are no higher than the third threshold, but the difference $D_{2H1L}$ or the difference $D_{1H2L}$ is higher than the third threshold, the detecting and controlling unit 408 can further compare the difference $D_{2H1L}$ with the difference $D_{1H2L}$. If the difference $D_{2H1L}$ is higher than the difference $D_{1H2L}$, the detecting and controlling unit 408 functions in a similar way as described above to move energy from the battery cell 402_N to the battery cell 402_3. Otherwise, the detecting and controlling unit 408 functions in a similar way as described above to move energy from the battery cell 402_1 to the battery cell 402_2.

To summarize, in the battery management system 400, the battery cells 402_1-402_N in the battery pack 402 can be divided into a first battery group and a second battery group based on different connections between the battery cells 402_1-402_N and the corresponding windings 404_1-404_N. For example, the positive terminals of the battery cells 402_1, 402_3, ..., and 402_(N−1) in the first battery group are connected to the polarity mark (one end with dot) of the windings 404_1, 404_3, ..., and 404_(N−1) and the negative terminals of the battery cells 402_2, 402_4, ..., and 402_N in the second battery group are connected to the polarity mark (one end with dot) of the windings 404_2, 404_4, ..., and 404_N. The detecting and controlling unit 408 selects a first battery cell having a maximal voltage and a second battery cell having a minimal voltage from the first battery group and selects a third battery cell having a maximal voltage and a fourth battery cell having a minimal voltage from the second battery group. The detecting and controlling unit 408 further turns on the corresponding switches alternately to move energy from the first battery cell to the fourth battery cell and to move energy from the third battery cell to the second battery cell according to the differences between the voltages of the selected battery cells. Since the detecting and controlling unit 408 can transfer energy between two pairs of the battery cells in every cycle, the voltage of the battery cells can be batter balanced.

Figure 5:
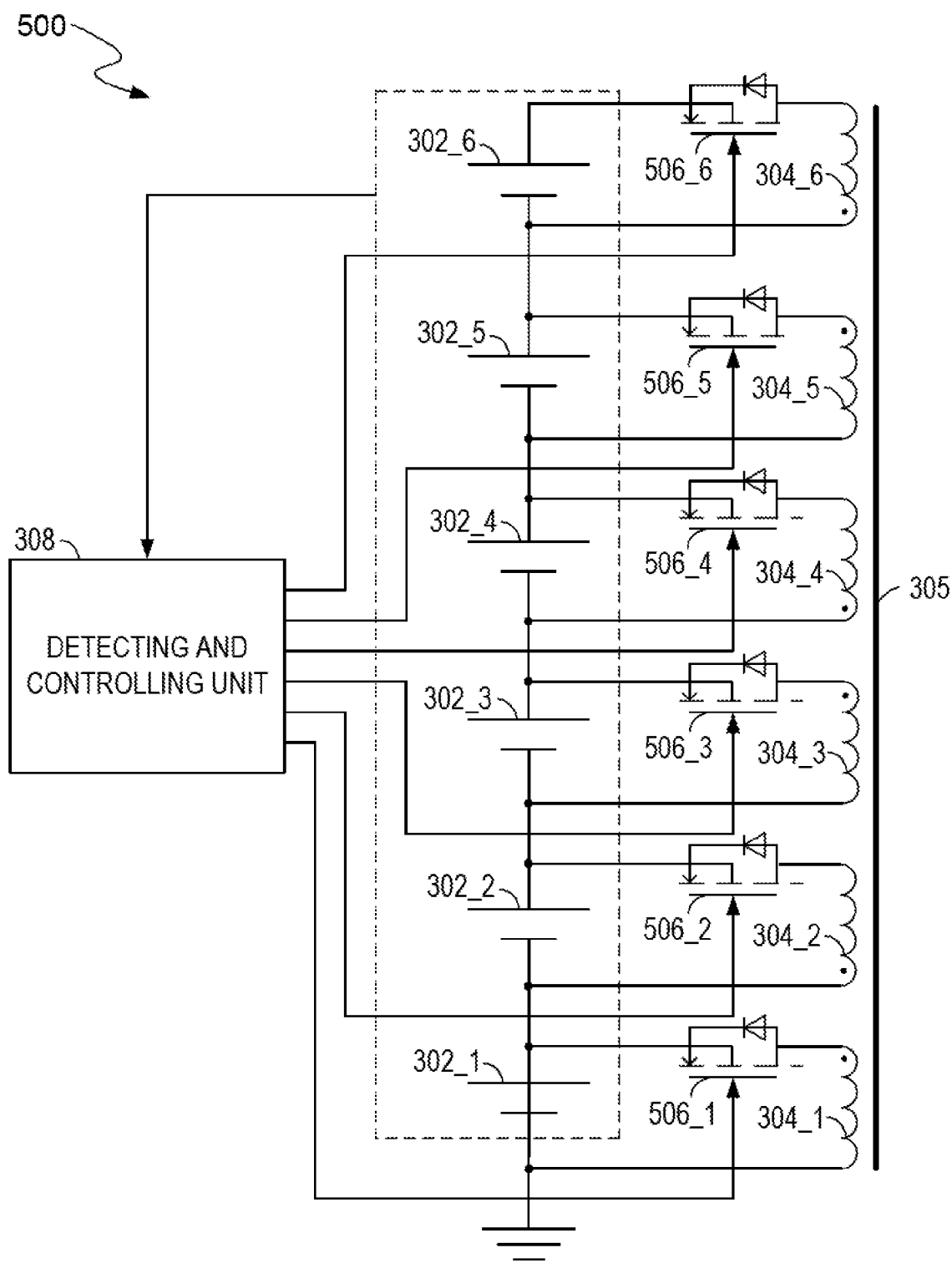
FIG. 5 illustrates a block diagram of a battery management system according to yet another embodiment of the present invention.

FIG. 5 illustrates a block diagram of a battery management system 500 according to another embodiment of the present invention. Elements that are labeled the same as in FIG. 3 have similar functions and will not be described herein. FIG. 5 is described in combination with FIG. 3.

In FIG. 5, transistors 506_1-506_6, e.g., metal oxide semiconductor field effect transistors (MOSFETs), function as switches in the battery management system 500. Each MOSFET includes a body diode. When the detecting and controlling unit 208 detects that the battery cell 302_1 having a maximal voltage and the battery cell 302_4 having a minimal voltage in the battery pack 302, the detecting and controlling unit 308 turns on the MOSFETs 506_1 and 506_4 alternately to transfer energy from the battery cell 302_1 to the battery cell 302_4. When the MOSFET 506_1 is turned on, the MOSFET 506_4 is turned off. Thus energy of the battery cell 302_1 can be transferred to and accumulated in the magnetic core 305. After the MOSFET 506_1 is turned off, the MOSFET 506_4 can be turned on. Thus a current can be induced in the winding 304_4. Because of the body diode exiting in each MOSFET, when the switch 506_1 is turned off, minor currents can be also induced in the windings 304_2 and 304_6. However, those induced currents are reversely proportional to equivalent load reactance coupled to the corresponding windings. As a result, when the MOSFETs 506_2 and 506_6 are turned off, the currents induced in the windings 304_2 and 304_6 are relatively small and can be ignored because the equivalent load reactance coupled to the windings 304_2 and 304_6 are relatively high. Thus the energy stored in the magnetic core 305 can be mainly transferred to the battery cell 302_4.

Figure 6:
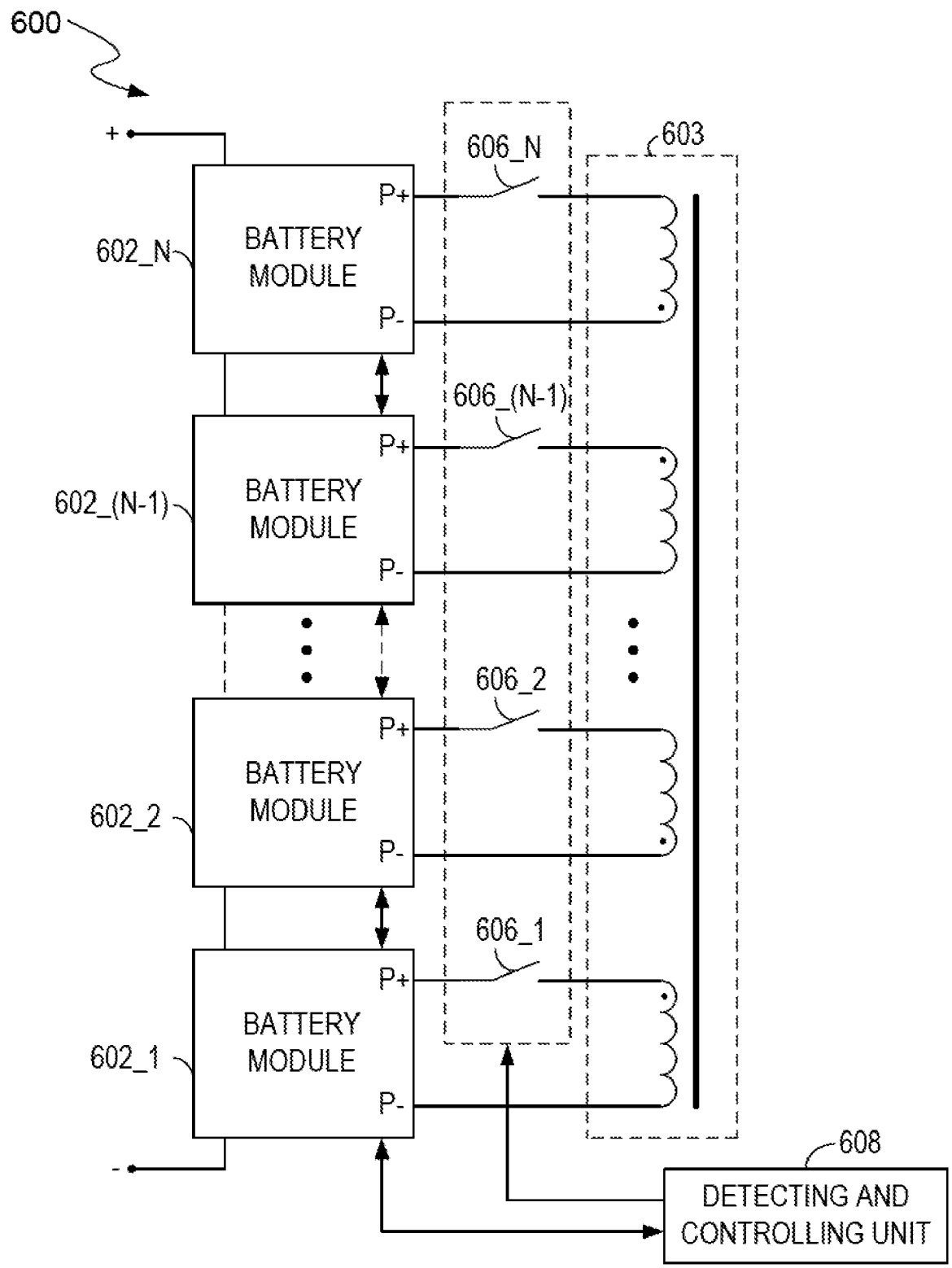
FIG. 6 illustrates a block diagram of a battery management system according to yet another embodiment of the present invention.

FIG. 6 illustrates a block diagram of a battery management system 600 according to another embodiment of the present invention. The battery management system 600 includes N serial-coupled battery modules 602_1, 602_2, ..., 602_(N−1) and 602_N. Each battery module 602_1, 602_2, ..., 602_(N−1) or 602_N includes multiple battery cells (not shown in FIG. 6). A magnetic device, e.g., a transformer 603, includes multiple windings wiring around a magnetic core. The battery modules 602_1; 602_2, ..., 602_(N−1) and 602_N are coupled to the corresponding windings of the transformer 603 via corresponding switches 606_1-606_N.

A detecting and controlling unit 608 detects voltages of the battery modules 602_1, 602_2, ..., 602_(N−1) and 602_N, and calculates a difference between a first voltage and a second voltage among the voltages of the battery modules 602_1, 602_2, ..., 602_(N−1) and 602_N. The first voltage is higher than the second voltage. In one embodiment, among the voltages of the battery modules 602_1, 602_2, ..., 602_(N−1) and 602_N, the first voltage is a maximal voltage and the second voltage is a minimal voltage.

If the difference between the first voltage and the second voltage is higher than a first threshold, e.g., 0.5V, the battery modules 602_1, 602_2, ..., 602_(N−1) and 602_N may work in an abnormal condition. Thus the battery management system 600 will check availabilities of the battery modules 602_1, 602_2, ..., 602_(N−1) and 602_N.

If the difference is lower than a second threshold, e.g., 50 mV, the battery modules 602_1, 602_2, ..., 602_(N−1) and 602_N can be regarded as well balanced.

If the difference is between the first threshold and the second threshold, the battery modules 602_1, 602_2, ..., 602_(N−1) and 602_N are unbalanced. Thus the transformer 603 turns on a first switch corresponding to a first battery module having the first voltage and a second switch corresponding to a second battery module having the second voltage alternately to move energy from the first battery module to the second battery module until the first voltage of the first battery module decreases approximately equal to the second voltage of the second battery module. A whole battery module, e.g., the battery module 602_1, 602_2, . . . , 602_(N−1) or 602_N, can be regarded as a battery cell during the operation described above. Thus the battery management system 600 functions similarly to the battery management systems 200, 400 and/or 500 as described above.

As described above, each battery module 602_1, 602_2, . . . , 602_(N−1) or 602_N includes multiple battery cells. Furthermore, each battery module 602_1, 602_2, . . . , 602_(N−1) or 602_N includes a subordinate transformer and a subordinate detecting and controlling unit (not shown in FIG. 6). Each subordinate transformer also includes multiple windings wiring around a magnetic core (not shown in FIG. 6). In each battery module 602_1, 602_2, . . . , 602_(N−1) or 602_N, the battery cells are coupled to the corresponding windings of the subordinate transformer via corresponding switches. The subordinate detecting and controlling unit detects voltages of the battery cells and move energy from a cell or group of cells to another cell or group of cells to balance the battery cells, based on the detecting result in a similar way as described in FIG. 2, FIG. 4 and/or FIG. 5.

Figure 7:
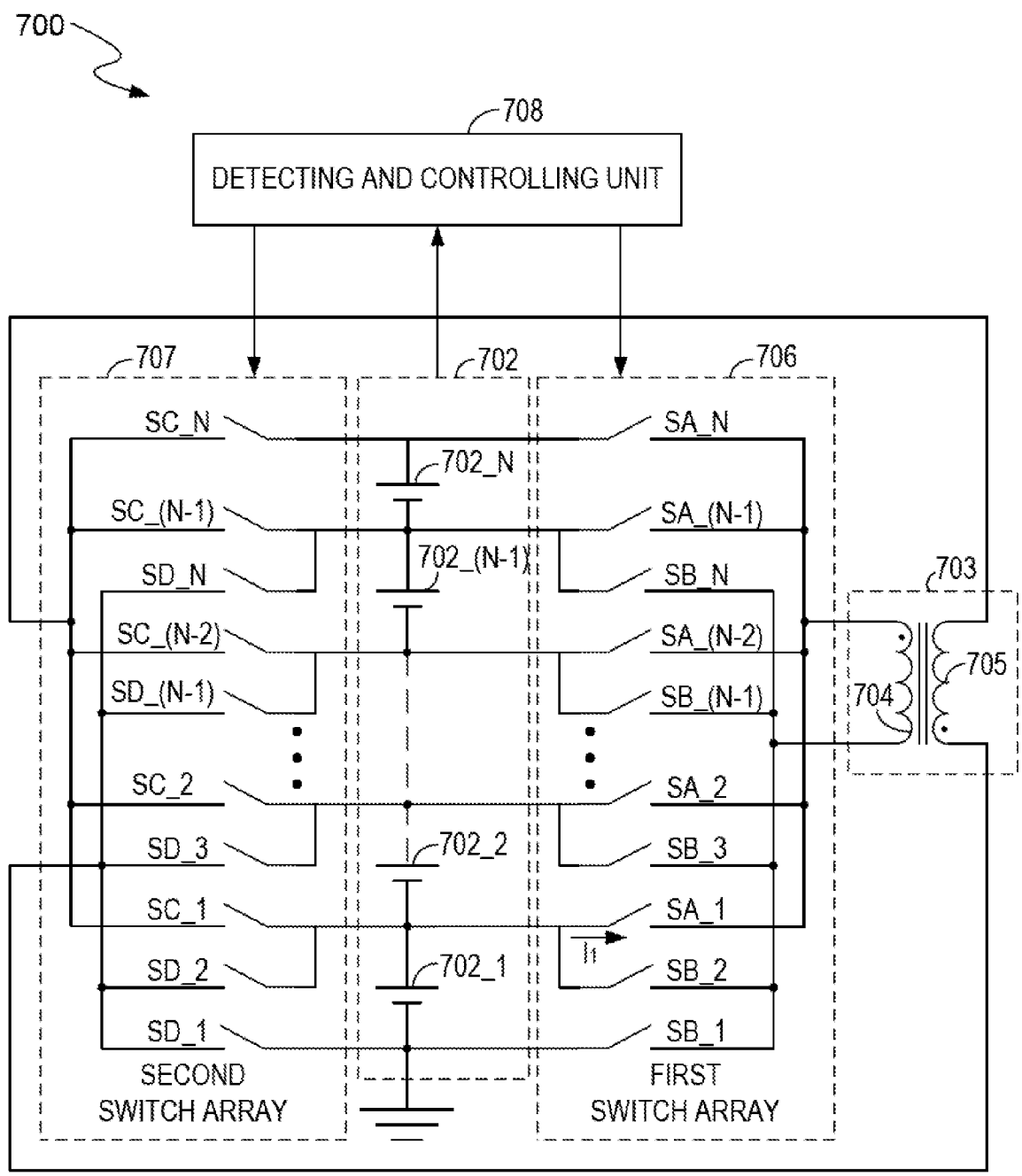
FIG. 7 illustrates a block diagram of a battery management system according to yet another embodiment of the present invention.

FIG. 7 illustrates a block diagram of a battery management system 700 according to yet another embodiment of the present invention. A battery pack 702 includes N serial-coupled battery cells 702_1-702_N. A magnetic device, e.g., a transformer 703, includes a first winding 704 and a second winding 705 wiring around a common magnetic core in a reverse direction. For each battery cell 702_K($1 \leq K \leq N$), a switch SA_K is coupled between a positive terminal of the battery cell 702_K and an end of the winding 704, a switch SB_K is coupled between a negative terminal of the battery cell 702_K and the other end of the winding 704, a switch SC_K is coupled between the positive terminal of the battery cell 702_K and an end of the winding 705, and a switch SD_K is coupled between the negative terminal of the battery cell 702_K and the other end of the winding 705.

A detecting and controlling unit 708 detects voltages of the battery cells 702_1-702_N and calculates a difference between a maximal voltage and a minimal voltage among the voltages of the battery cells 702_1-702_N.

If the difference between the maximal voltage and the minimal voltage is higher then a first threshold, e.g., 0.5V, abnormal condition may present in the battery pack 702. Thus the battery management system 700 will check the availability of the battery pack 702.

If the difference is lower than a second threshold, e.g., 50 mV, the battery cells 702_1-702_N can be regarded as well balanced.

If the difference is between the first threshold and the second threshold, the battery cells 702_1-702_N are unbalanced. Thus the detecting and controlling unit 708 controls the corresponding switches coupled to a battery cell, e.g., the battery cell 702_1, having the maximal voltage and a second battery cell, e.g., the battery cell 702_N, having the minimal voltage respectively to move energy from the battery cell 702_1 to the battery cell 702_N via the first and second windings 704 and 705.

The first winding 704 functions as a primary winding and the second winding 705 functions as a secondary winding in the transformer 703. Under such circumstance, the detecting and controlling unit 708 generates a first control signal having a frequency $F_1$ with a duty cycle $D_1$ to the switch SA_1 and the switch SB_1 coupled to the battery cell 702_1 (in following description, a switch set SAB_1 will represent the switch SA_1 and the switch SB_1 for short description), and generates a second control signal having the same frequency $F_1$ with a duty cycle equal to or less than $(1-D_1)$ to the switch SC_N and the switch SD_N coupled to the battery cell 702_N (in following description, a switch set SCD_N will represent the switch SC_N and the switch SD_N for short description) to turn on the switch set SAB_1 and the switch set SCD_N alternately.

More specifically, when the switch set SAB_1 are turned on in response to the first control signal, the switch set SCD_N are turned off in response to the second control signal. A current $I_1$ can flow from the battery cell 702_1 to the first winding 704, and energy of the battery cell 702_1 can be transferred to and accumulated in a magnetic core of the transformer 703. After the switch set SAB_1 are turned off in response to the first control signal, the switch set SCD_N are turned on in response to the second control signal. Once the switch set SAB_1 are turned off, the current becomes to approximately zero. When the switch set SCD_N are turned on, a current $I_N$ induced in the second winding 705 flows to the battery cell 702_N for charging the battery cell 702_N. Thus the Energy stored in the magnetic core of the transformer 703 can be released to the battery cell 702_N. Finally, energy can be transferred from the battery cell 702_1 to the battery cell 702_N. Accordingly, the voltage of the battery cell 702_1 is decreased and the voltage of the battery cell 702_N is increased. The detecting and controlling unit 208 continues to turn on the switch set SAB_1 and the switch set SCD_N alternately until the voltage of the battery cell 702_1 decreases approximately equal to the voltage of the battery cell 702_N.

In yet another embodiment, the second winding 705 functions as a primary winding and the first winding 704 functions as a secondary winding in the transformer 703. Under such circumstance, the detecting and controlling unit 708 generates the first control signal to a switch set SCD_1 including the switches SC_1 and SD_1 coupled to the battery cell 702_1 and generates the second control signal to a switch set SAB_N including the switches SA_N and SB_N coupled to the battery cell 702_N for turning on the switch set SCD_1 and the switch set SAB_N alternately.

When the switch set SCD_1 are turned on in response to the first control signal, the switch set SAB_N are turned off in response to the second control signal. A current $I_1$ can flow from the battery 702_1 to the second winding 705, and energy of the battery cell 702_1 can be transferred to and accumulated in the magnetic core of the transformer 703. After the switch set SCD_1 are turned off in response to the first control signal, the switch set SAB_N are turned on in response to the second control signal. Once the switch set SCD_1 are turned off, the current $I_1$ becomes to approximately zero. When the switch set SAB_N are turned on, a current $I_N$ induced in the first winding 704 flows to the battery cell 702_N for charging the battery cell 702_N. Thus the energy stored in the magnetic core of the transformer 703 can be released to the battery cell 702_N. The detecting and controlling unit 208 continues to turn on the switch set SCD_1 and the switch set SAB_N alternately until the voltage of the battery cell 702_1 decreases approximately equal to the voltage of the battery cell 702_N.

Additionally, the other switches, except the switches SA_1, SB_1, SC_N and SD_N are kept off during the operation of balancing energy between the battery cell 702_1 and the battery cell 702_N. Thus energy will not be transferred from the other battery cells to the magnetic core of the transformer 703 or released from the magnetic core of the transformer 703 to the other battery cells.

Advantageously, by coupling the winding 704 to the battery cells 702_1-702_N via the switches SA_1-SA_N and SB_1-SB_N and by coupling the winding 705 to the battery cells 702_1-702_N via the switches SC_1-SC_N and SD_1-SD_N, the battery cells 702_1-702_N can be connected to the windings 704 and 705 separately to transfer energy to the magnetic device 703 and to receive energy from the magnetic device 703. Thus the battery management system 700 can transfer energy between two battery cells by coupling the first battery cell to one winding for transferring energy of the first battery cell to the magnetic core and coupling the second battery cell to the other winding for transferring the energy stored in the magnetic core to the second battery cell. Hence, only two windings are needed in the battery management system 700 to balance any two battery cells in the battery cells 702_1-702_N, which may decrease the cost and size of the system.

Figure 8:
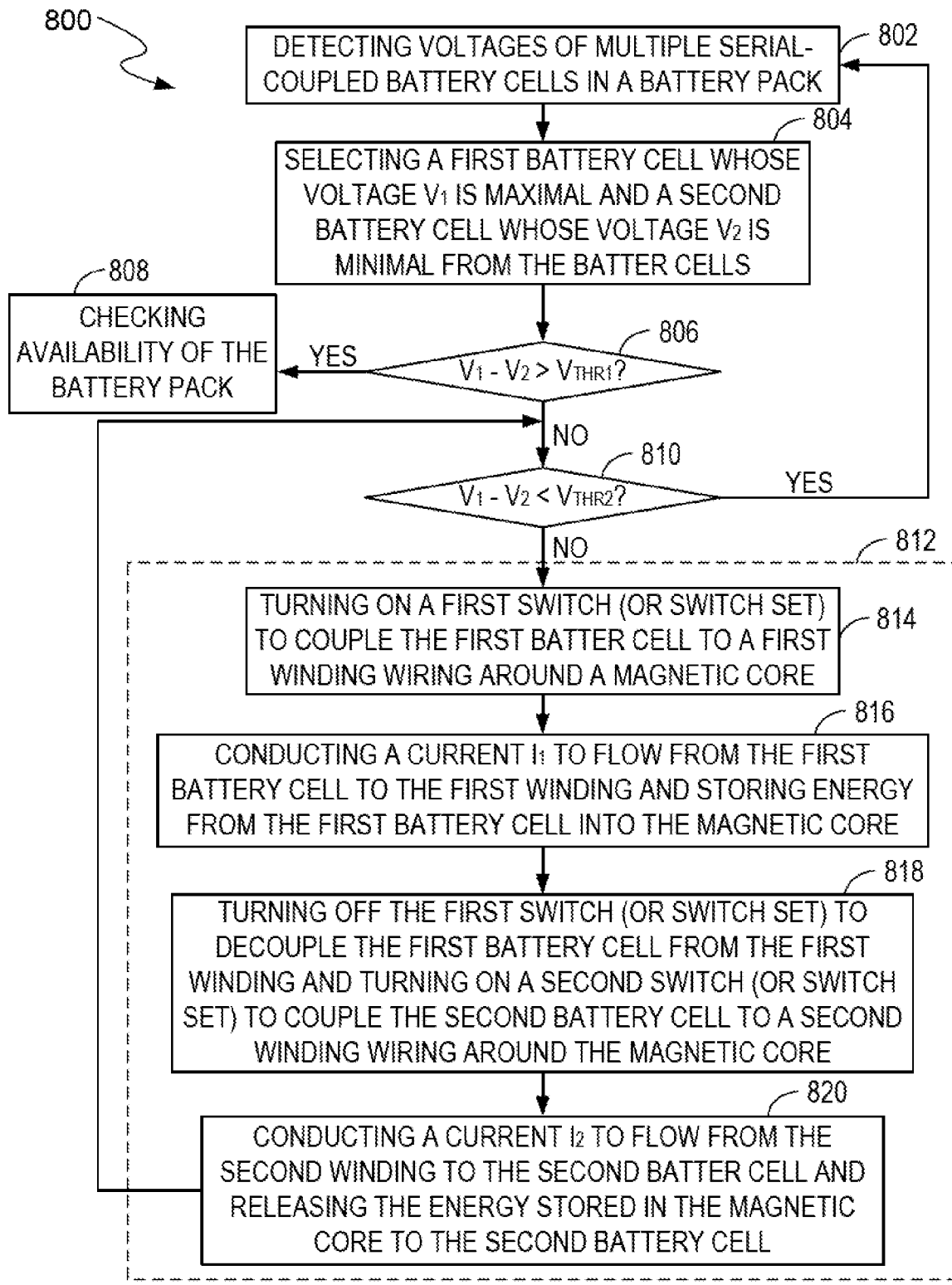
FIG. 8 illustrates a flowchart of operations performed by a battery management system according to one embodiment of the present invention.

FIG. 8 illustrates a flowchart 800 of operations performed by a battery management system, e.g., a battery management system 700 in FIG. 7, according to one embodiment of the present invention. FIG. 8 is described in combination with FIG. 7.

In block 802, the detecting and controlling unit 708 detects voltages of multiple battery cells 702_1-702_N. In block 804, the detecting and controlling unit 708 selects a first battery cell, e.g., the battery cell 702_1, with a maximal voltage $V_1$ and a second battery cell, e.g., the battery cell 702_N, with a minimal voltage $V_2$ from the battery cells 702_1-702_N. In block 806, if a difference between the voltage $V_1$ of the first battery cell and the voltage $V_2$ of the second battery cell is higher than a first threshold $V_{THR1}$, e.g., 0.5V, abnormal condition may present in the battery pack 702. Thus the battery management system 700 will check availability of the battery pack 702 in block 808. If the difference is no higher than the first threshold $V_{THR1}$ in block 806, the flowchart 800 goes to block 810.

In block 810, if the difference is lower than a second threshold, e.g., 50 mV, energy among the battery cells 702_1-702_N can be regarded as well balanced. The flowchart 800 returns to block 802 to monitor the voltages of the battery cells 702_1-702_N continuously.

If the difference is not lower than the second threshold in block 810, the battery cells 702_1-702_N are unbalanced. Thus the detecting and controlling unit 700 will move energy from the battery cell 702_1 to the battery cell 702_N in block 812.

In one embodiment, the step in block 812 includes multiple sub-steps shown in blocks 814-820. In block 814, a first switch or a first switch set including at least two switches are turned on to couple the battery cell 702_1 to a first winding wiring around a magnetic core, e.g., the winding 704 of the transformer 703. Thus a current $I_1$ can be conducted to flow from the battery cell 702_1 to the first winding and energy from the first battery cell 702_1 can be stored in the magnetic core in block 816. In block 818, the first switch or the first switch set are turned off to decouple the battery cell 702_1 from the first winding and a second switch or a second switch set including at least two switches are turned on to couple the battery cell 702_N to a second winding wiring around the magnetic core, e.g., the winding 705 of the transformer 703. Thus a current $I_2$ induced in the second winding can be conducted to flow through the battery cell 702_N and energy stored in the magnetic core is released into the battery cell 702_N in block 820. Then the battery monitoring process returns to block 810.

If the difference between the voltage $V_1$ of the battery cell 702_1 and the voltage $V_2$ of the battery cell 702_N is lower than the second threshold in block 810, the flowchart 800 returns to block 802. Otherwise, the flowchart 800 goes to block 814. The detecting and controlling unit 708 continues to transfer energy from the battery cell 702_1 to the battery cell 702_N until the difference between the voltage $V_1$ and the voltage $V_2$ decreases lower than the second threshold.

Figure 9:
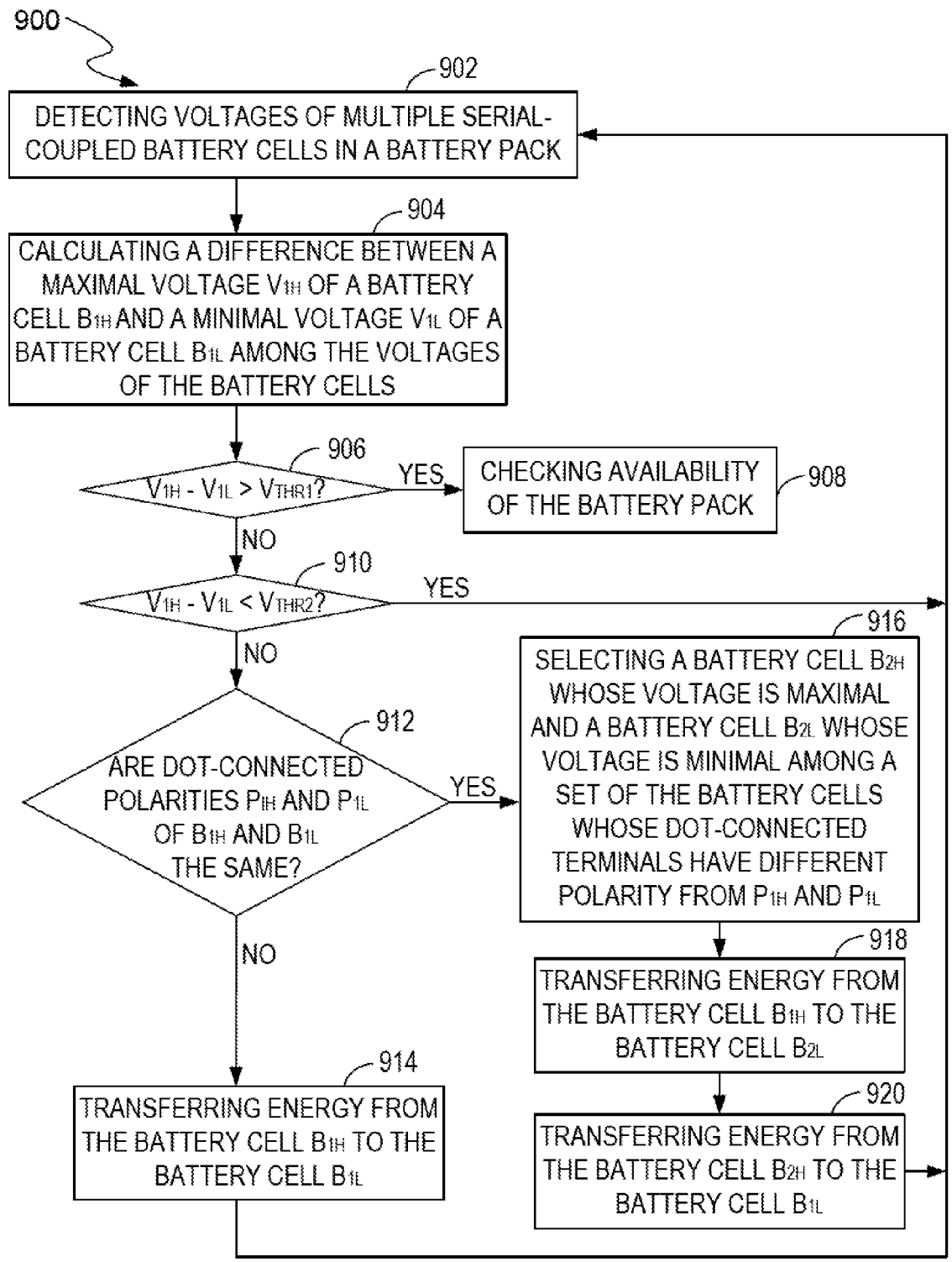
FIG. 9 illustrates a flowchart of operations performed by a battery management system according to another embodiment of the present invention.

FIG. 9 illustrates a flowchart 900 of operations performed by a battery management system, e.g., the battery management system 200 in FIG. 2, according to one embodiment of the present invention. FIG. 9 is described in combination with FIG. 2.

In block 902, the detecting and controlling unit 208 detects voltages of multiple serial-coupled battery cells 202_1-202_6. In block 904, the detecting and controlling unit 208 calculates a difference between a maximal voltage $V_{1H}$ and a minimal voltage $V_{1L}$ from the voltages of the battery cells 202_1-202_6. In block 906, if the difference between the voltages $V_{1H}$ and $V_{1L}$ is lower than a first threshold, e.g., 0.5V, abnormal condition may present in the battery pack 202. Thus the battery management system 200 will check availability of the battery pack 202 in block 908. If the difference is no lower than the first threshold, the flowchart 900 goes to block 910.

In block 910, if the difference is lower than a second threshold, e.g., 50 mV, the battery cells 202_1-202_6 can be regarded as well balanced. The flowchart 900 returns to block 902 to detect the voltages of the battery cells 202_1-202_6 continuously. If the difference is no lower than the second threshold in block 910, the flowchart 900 goes to block 912.

In block 912, if a dot-connected terminal $P_{1H}$ of a battery cell $B_{1H}$ having the maximal voltage $V_{1H}$ has different polarity from a dot-connected terminal $P_{1L}$ of a battery cell $B_{1L}$ having the minimal voltage $V_{1L}$, the flowchart 900 goes to block 914. Otherwise, the flowchart 900 goes to block 916.

In block 914, the detecting and controlling unit 208 move energy from the battery cell $B_{1H}$ to the battery cell $B_{1L}$ in a similar way as described in block 812. Then the flowchart 900 returns to block 902. In block 916, the detecting and controlling unit 208 selects a battery cell $B_{2H}$ with a maximal voltage and a battery cell $B_{2L}$ with a minimal voltage from a set of the battery cells whose dot-connected terminals have different polarity from the dot-connected terminals $P_{1H}$ and $P_{1L}$. In block 918, the detecting and controlling unit 208 transfers energy from the battery cell $B_{1H}$ to the battery cell $B_{2L}$ in a similar way as described in block 812. In block 920, the detecting and controlling unit 208 transfers energy from the battery cell $B_{2H}$ to the battery cell $B_{1L}$ in a similar way as described in block 812. Then the flowchart 900 returns to block 902.

Figure 10:
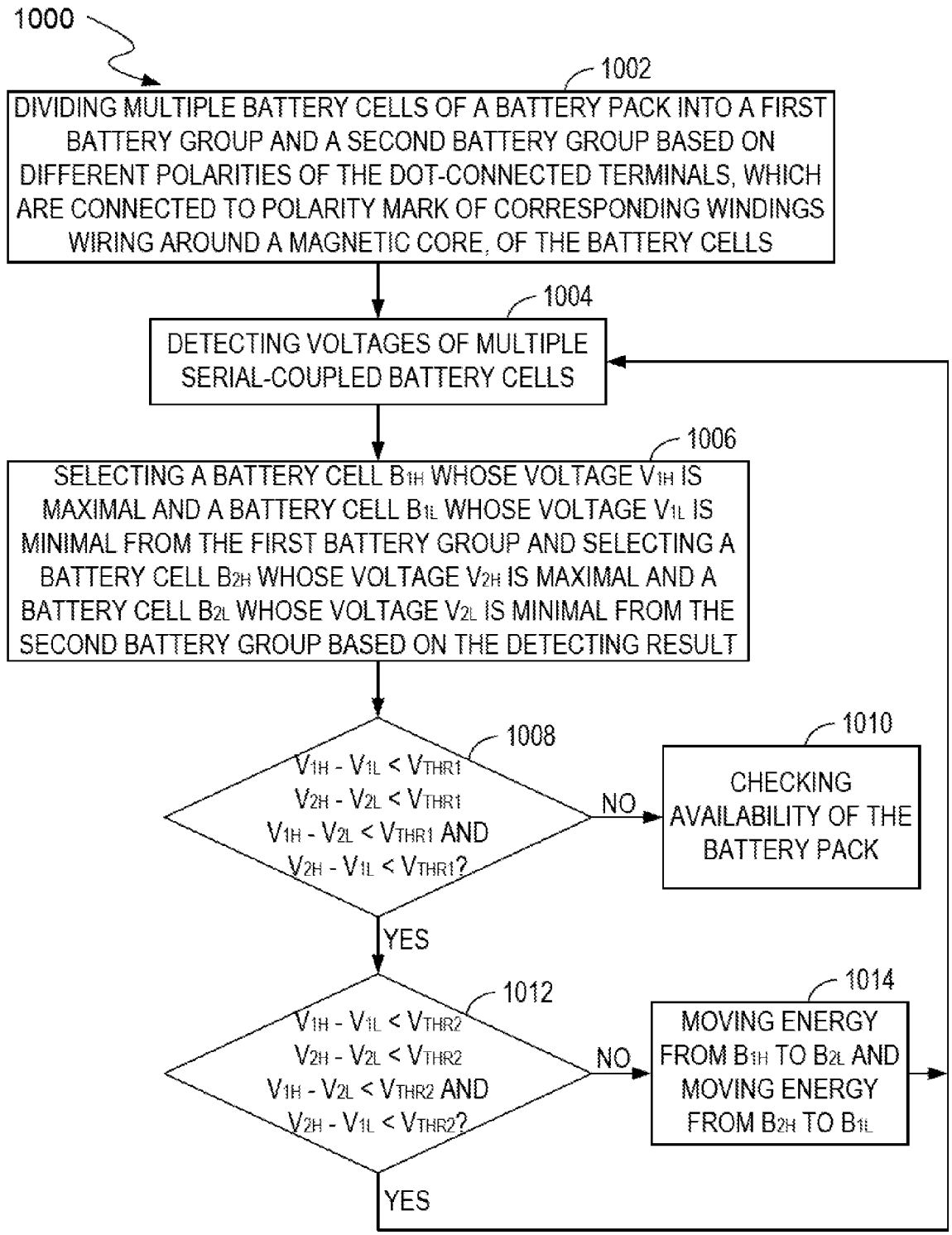
FIG. 10 illustrates a flowchart of operations performed by a battery management system according to yet another embodiment of the present invention.

FIG. 10 illustrates a flowchart 1000 of operations performed by a battery management system, e.g., the battery management system 400 in FIG. 4, according to one embodiment of the present invention. FIG. 10 is described in combination with FIG. 4.

In block 1002, multiple serial-coupled battery cells 402_1-402_N are divided into a first and a second groups. The dot-connected terminals of the battery cells, e.g., the battery cells 402_1, 402_3, ..., 402_(N−1), in the first group have different polarity from the dot-connected terminals of the battery cells, e.g., the battery cells 402_2, 402_4, ..., 402_N, in the second group.

In block 1004, the detecting and controlling unit 408 detects voltages of the battery cells 402_1-402_N. In block 1006, the detecting and controlling unit 408 selects a battery cell $B_{1H}$ with a maximal voltage $V_{1H}$ and a battery cell $B_{1L}$ with a minimal voltage $V_{1L}$ from the first battery group and selects a battery cell $B_{2H}$ with a maximal voltage $V_{2H}$ and a battery cell $B_{2L}$ with a minimal voltage $V_{2L}$ from the second battery group.

In block 1008, if a difference $D_{1H1L}$ between the voltage $V_{1H}$ and the voltage $V_{1L}$, a difference $D_{2H2L}$ between the voltage $V_{2H}$ and the voltage $V_{2L}$, a difference $D_{1H2L}$ between the voltage $V_{1H}$ and the voltage $V_{2L}$, or a difference $D_{2H1L}$ between the voltage $V_{2H}$ and the voltage $V_{1L}$ is higher than a first threshold, e.g., 0.5V, abnormal condition may present in the battery pack 402. Thus the battery management system 400 will check availability of the battery pack 402 in block 1010. If the differences $D_{1H1L}$, $D_{2H2L}$, $D_{1H2L}$, and $D_{2H1L}$ are no higher than the first threshold, the flowchart 1000 goes to block 1012.

In block 1012, if the differences $D_{1H1L}$, $D_{2H2L}$, $D_{1H2L}$, and $D_{2H1L}$ are lower than a second threshold, e.g., 50 mV, the battery cells 402_1-402_N can be regarded as well balanced and the flowchart 1000 returns to block 1004. Otherwise, the flowchart goes to block 1014 to move energy from the battery cell $B_{1H}$ to the battery cell $B_{2L}$ and move energy from the battery cell $B_{2H}$ to the battery cell $B_{1L}$.

Figure 11:
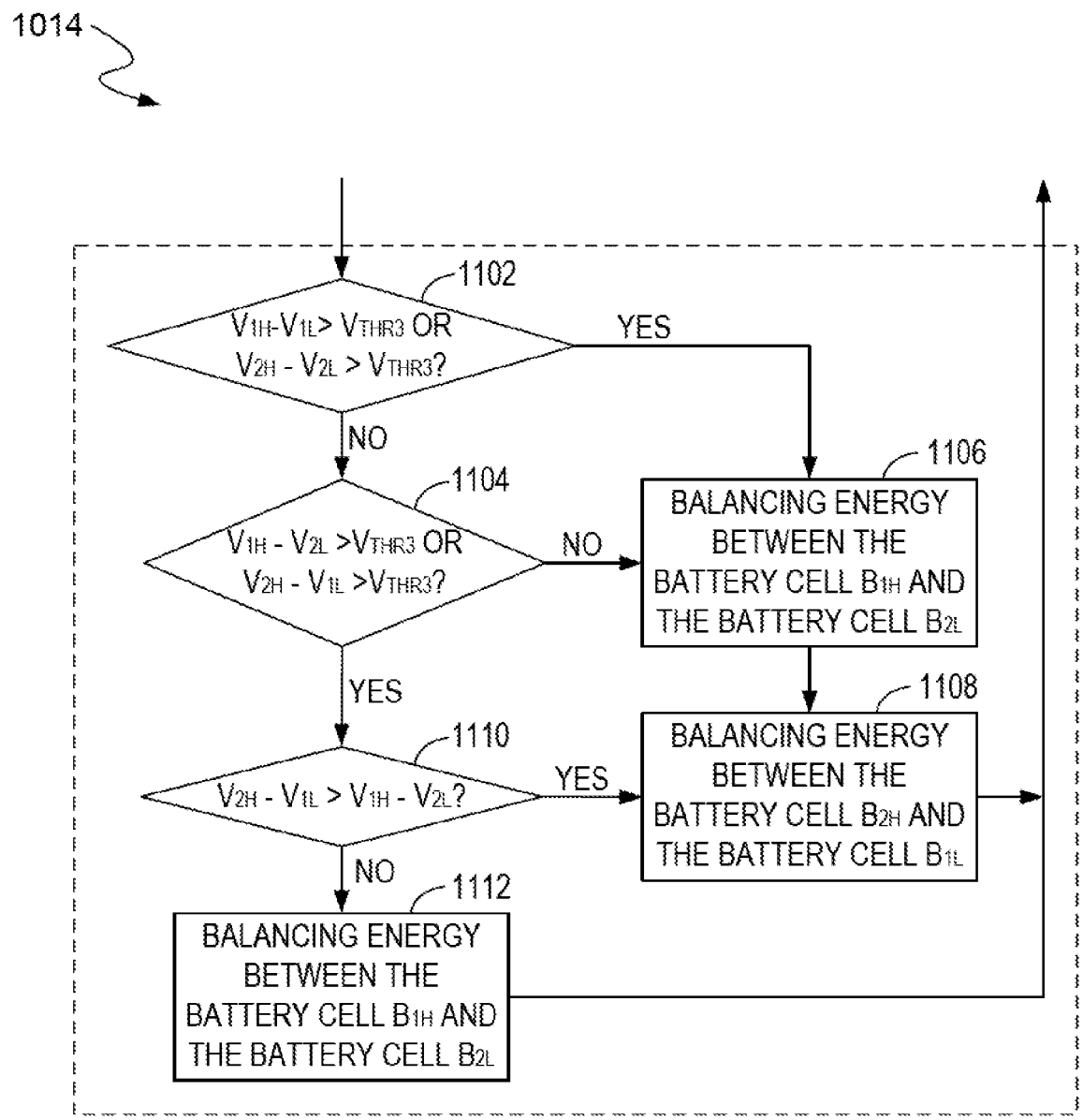
FIG. 11 illustrates a flowchart of extension operations performed by the battery management system in FIG. 10 according to one embodiment of the present invention.

Block 1014 further includes multiple steps illustrated by FIG. 11 according to one embodiment of the present invention. As shown in FIG. 11, the flowchart 1000 goes to block 1102. In block 1102, if the difference $D_{1H1L}$ or the difference $D_{2H2L}$ is higher than a third threshold, e.g., 0.2V, the flowchart 1000 goes to block 1106. Otherwise, the flowchart 1000 goes to block 1104.

In block 1104, if the difference $D_{1H2L}$ or the difference $D_{2H1L}$ is higher than the third threshold, the flowchart 1000 goes to block 1110. Otherwise, the flowchart 1000 goes to block 1106.

In block 1106, the detecting and controlling unit 408 moves energy from the battery cell $B_{1H}$ to the battery cell $B_{2L}$ in a similar way as described in block 812. In block 1108, the detecting and controlling unit 408 moves energy from the battery cell $B_{2H}$ to the battery cell $B_{1L}$ in a similar way as described in block 812. Then the flowchart 1000 returns to block 1004.

In block 1110, if the difference $D_{2H1L}$ is higher than the difference $D_{1H2L}$, the flowchart 1000 goes to block 1108 to move energy from the battery cell $B_{2H}$ to the battery cell $B_{1L}$ in a similar way as described in block 812. Then the flowchart 1000 returns to block 1004.

In block 1110, if the difference $D_{2H1L}$ is no higher than the difference $D_{1H2L}$, the flowchart 1000 goes to block 1112. In block 1112, the detecting and controlling unit 408 moves energy from the battery cell $B_{1H}$ to the battery cell $B_{2L}$ in a similar way as described in block 812. Then the flowchart 1000 returns to block 1004.

Additionally, as described above, the battery management system 200 can be used to move energy among multiple battery cells to balance the battery cells during a discharging process. Similarly, the battery management systems 400, 500, 600 and 700 can also move energy among multiple battery cells to balance the battery cells during a discharging process such that discharging time of the whole battery pack can be increased and the battery cells can be prevented from being over-discharged during the discharging process, which may extend the useful life and improve the efficiency of the battery pack.

Accordingly, embodiments in accordance with the present invention provide a battery management system for move energy from a cell or group of cells to another cell or group of cells to balance multiple battery cells. The battery management system includes a magnetic device. The magnetic device includes a magnetic core and multiple windings wiring around the magnetic core. The multiple battery cells are coupled to the multiple windings wiring around a magnetic core via multiple switches respectively. The battery management system further includes a detecting and controlling unit for detecting voltage of the battery cells and controlling the switches for transferring energy among the battery cells via the windings. When the battery management system detects a difference between two battery cells are higher than a predetermined threshold, the battery management system turns on two switches respectively coupled to the two battery cells alternately for transferring energy from the first battery cell with a higher voltage to the second battery cell with a lower voltage via the corresponding windings until the voltage of the first battery cell is approximately equal to the voltage of the second battery cell.

When the first switch coupled to the first battery cell is turned on, the second switch coupled to the second battery cell is turned off. A current can be conducted to flow from the first battery cell to the corresponding winding. Thus energy of the first battery cell can be transferred to and stored in the magnetic core. After the first switch is turned off, the second switch is turned on. A current is induced in the corresponding winding and flows to the second battery cell. Thus energy stored in the magnetic core can be released to the second battery cell.

Additionally, the switches coupled to the other battery cells are kept off during the operation of transferring energy from the first battery cell to the second battery cell. Advantageously, the battery management system can move energy between the target battery cells and other battery cells can be prevented from sending or receiving energy during the energy balancing operation, which may improve the system efficiency.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A battery management system for managing a battery pack including a plurality of battery cells, comprising:
   a magnetic device comprising a plurality of windings wiring around a magnetic core;
   a plurality of switches, each switch coupled between a battery cell and a winding; and
   a detecting and controlling unit operable for detecting parameters of said battery cells, and for turning on a first switch, which is coupled between a first battery cell and a first winding, and a second switch, which is coupled between a second battery cell and a second winding, alternately to balance said first battery cell and said second battery cell via said magnetic device if a first parameter of said first battery cell is greater than a second parameter of said second battery cell, wherein the detecting and controlling unit further performs the steps of:
- selecting a battery cell $B_{1H}$ whose parameter has a maximal value and a battery cell $B_{1L}$ whose parameter has a minimal value from said plurality of battery cells;
- determining whether a terminal, which is coupled to a polarity mark of a corresponding winding, of said battery cell $B_{1H}$ has different polarity from a terminal, which is coupled to a polarity mark of a corresponding winding, of said battery cell $B_{1L}$;
- if said terminal of said battery cell $B_{1H}$ has different polarity from said terminal of said batter cell $B_{1L}$ turning on respective switches coupled to said battery cells $B_{1H}$ and $B_{1L}$ alternately to balance said battery cell $B_{1H}$ and said battery cell $B_{1L}$; and
- if said terminal of said battery cell $B_{1H}$ has the same polarity as said terminal of said batter cell $B_{1L}$ selectins a batter cell $B_{2H}$ whose parameter has a maximal value and a battery cell $B_{2L}$ whose parameter has a minimal value from a set of said battery cells whose terminals, which are coupled to polarity marks of corresponding windings, have different polarity from said terminal of said batter cell $B_{1H}$ turning on respective switches coupled to said battery cells $B_{1H}$ and $B_{2L}$ alternately to balance said battery cell $B_{1H}$ and said batter cell $B_{2L}$ and turning on respective switches coupled to said battery cells $B_{2H}$ and $B_{1L}$ alternately to balance said battery cell $B_{2H}$ and said battery cell $B_{1L}$.

2. The battery management system of claim 1, wherein said detecting and controlling unit detects voltages of said battery cells and turns on said first switch and said second switch alternately to balance said first battery cell and said second battery cell via said magnetic device if a first voltage of said first battery cell is greater than a second voltage of said second battery cell.

3. The battery management system of claim 1, wherein said detecting and controlling unit turns on said first switch and turns off said second switch to conduct a first current flowing from said first battery cell to said first winding for storing energy from said first battery cell into said magnetic core, and then turns off said first switch and turns on said second switch to conduct a second current flowing from said second winding to said second battery cell for releasing said energy stored in said magnetic core to said second battery cell.

4. The battery management system of claim 1, wherein a terminal, which is coupled to a polarity mark of said first winding, of said first battery cell has different polarity from a terminal, which is coupled to a polarity mark of said second winding, of said second battery cell.

5. The battery management system of claim 1, wherein said detecting and controlling unit calculates a difference between said first parameter of said first battery cell and said second parameter of said second battery cell, and turns on said first switch and said second switch alternately to balance said first battery cell and said second battery cell if said difference is greater than a threshold.

6. The battery management system of claim 1, wherein said detecting and controlling unit further performs the steps of:
- selecting a battery cell $B_{1H}$ whose parameter has a maximal value and a battery cell $B_{1L}$ whose parameter has a minimal value from a first set of said battery cells whose positive terminals are coupled to polarity marks of corresponding windings;
- selecting a battery cell $B_{2H}$ whose parameter has a maximal value and a battery cell $B_{2L}$ whose parameter has a minimal value from a second set of said battery cells whose negative terminals are coupled to polarity marks of corresponding windings;
- turning on respective switches coupled to said battery cells $B_{1H}$ and $B_{2L}$ alternately to balance said battery cell $B_{1H}$ and said battery cell $B_{2L}$; and
- turning on respective switches coupled to said battery cells $B_{2H}$ and $B_{1L}$ alternately to balance said battery cell $B_{2H}$ and said battery cell $B_{1L}$.

* * * * *

UNITED STATES PATENT AND TRADEMARK OFFICE
CERTIFICATE OF CORRECTION

PATENT NO.         : 8,164,305 B2
APPLICATION NO.    : 12/891784
DATED              : April 24, 2012
INVENTOR(S)        : Chutao Zhang et al.

Page 1 of 3

It is certified that error appears in the above-identified patent and that said Letters Patent is hereby corrected as shown below:

In the drawings, Sheet 3, FIG. 3, the label TON' of the duration for the wave form 330 should be TON".

Sheet 5, FIG. 5, the labels 302_1, 302_2, 302_3, 302_4, 302_5, 302_6, 304_1, 304_2, 304_3, 304_4, 304_5, 304_6, 305 and 308 are changed to 202_1, 202_2, 202_3, 202_4, 202_5, 202_6, 204_1, 204_2, 204_3, 204_4, 204_5, 204_6, 205 and 208, respectively. Additionally, the connection line across the battery cell 302_1 (now the battery cell 202_1) is removed.

Sheet 7, FIG. 7 is amended as follows. Connection nodes between the switches are added, and the connection line connected to the positive terminal of the battery cell 702_2 is changed to a solid line.

Sheet 10, FIG. 10 is amended as follows. In block 1002, the description "POLARITY MARK" is changed to "POLARITY-MARKED TERMINALS."

In the specification, column 3 line 47, insert --,-- after "cells" and remove "and."
In column 3, lines 67 to column 4 line 1, replace "polarity marks" with "poliarty-marked terminals."
In column 4, line 3, replace "polarity marks" with "poliarty-marked terminals."
In column 4, line 8, replace "polarity marks" with "poliarty-marked terminals."
In column 4, lines 22 and 24, insert --the-- before "second."
In column 4, line 29, change "flow" to "flows."
In column 4, line 32, add a "," after "Thus" and change "by" to "be."
In column 4, line 36, change the first occurrence of "flow" to "flows."
In column 4, line 39, add a "," after "Thus."
In column 4, lines 41-49, replace all instances of "polarity marks" with "polarity-marked terminals."
In column 4, lines 50-61, replace all instances of "which" with "whose."
In column 4, line 65, replace "VIL" with "V1L."
In column 5, line 1, add "an" before "abnormal condition."
In column 5, line 9 , delete "each."
In column 5, line 19, replace "VH" in the first sentence with "V1H."

Signed and Sealed this
Seventh Day of August, 2012

David J. Kappos
*Director of the United States Patent and Trademark Office*

In column 5, line 21 replace "VL" with "V1L."
In column 5, line 66, remove "and" from "predetermined average value of the current l_1, and L represents."
In column 5, line 66, insert --and-- between "winding 204_1" and "F1."
In column 5, line 67, replace "signal" with "signals."
In column 6, line 27, replace "functions" with "function."
In column 6, line 45, replace "VH" with "V1H."
In column 6, line 47, replace "VL" with "V1L."
In column 6, line 49, replace "flows" with "flowing."
In column 6, line 55, remove the "," after "I3."
In column 7, line 26, insert --202_1-202_6-- after "battery cells."
In column 7, line 26, replace "similarly" with "similar."
In column 7, line 29, add "to one another" after "equal."
In column 7, line 36, insert --a-- after "If."
In column 7, line 38, replace "or" with "and."
In column 7, line 41, add a "," after "Thus."
In column 8, lines 14-22, replace all instances of "detects" with "detect" and "selects" with "select."
In column 8, line 27, insert --an-- before "abnormal."
In column 8, line 28, add a "," after "Thus."
In column 8, line 36, add a "," after "Thus."
In column 9, line 5, replace "switch" with "switches."
In column 9, line 19, replace "402_1" with "402_N."
In column 9, line 20, replace "404_1" with "404_N."
In column 9, line 20, insert --,-- after "Thus."
In column 9, line 31, replace "switch" with "switches."
In column 9, line 54, replace "polarity mark (one end with dot)" with "polarity-marked terminals."
In column 10, line 5, replace "batter" with "better."
In column 10, lines 6-10, replace all instances of "FIG. 3" to "FIG. 2."
In column 10, line 15, replace "302_1" with "202_1."
In column 10, line 16, replace "302_4" with "202_4."
In column 10, line 17, replace "302" with "202."
In column 10, line 19, replace "302_1" with "202_1."
In column 10, line 20, replace "302_4" with "202_4."
In column 10, line 22, replace "302_1" with "202_1."
In column 10, line 23, replace "305" with "205."
In column 10, line 25, replace "304_4" with "204_4."
In column 10, line 27, replace "304_2 and 304_6" with "204_2 and 204_6."
In column 10, line 31, replace "304_2" with "204_2."
In column 10, line 32, replace "304_6" with "204_6."
In column 10, line 33, replace "304_2" with "204_2."
In column 10, line 34, replace "304_6" with "204_6."
In column 10, line 35, replace "305" with "205."
In column 10, line 36, replace "302_4" with "202_4."
In column 11, line 50, insert --an-- before "abnormal."
In column 11, line 50, add a "," after "Thus."

CERTIFICATE OF CORRECTION (continued)
U.S. Pat. No. 8,164,305 B2

In column 11, line 58, add a "," after "Thus."
In column 12, line 18, replace "a magnetic" with "the magnetic."
In column 13, line 12, add a "," after "Thus."
In column 13, line 36, add "an" before "abnormal."
In column 13, line 37, add a "," after "Thus."
In column 14, line 2, add a "," after "Then."
In column 14, line 23, replace "VIH" with "V1H."
In column 14, line 23, replace "lower" with "higher."
In column 14, line 26, replace "lower" with "higher."
In column 15, line 3, replace "VIH" with "V1L."
In column 15, line 12, insert --an-- before "abnormal."
In column 16, line 8, replace "voltage" with "voltages."
In column 16, line 27, insert --,-- after "Thus."